UNITED STATES PATENT OFFICE.

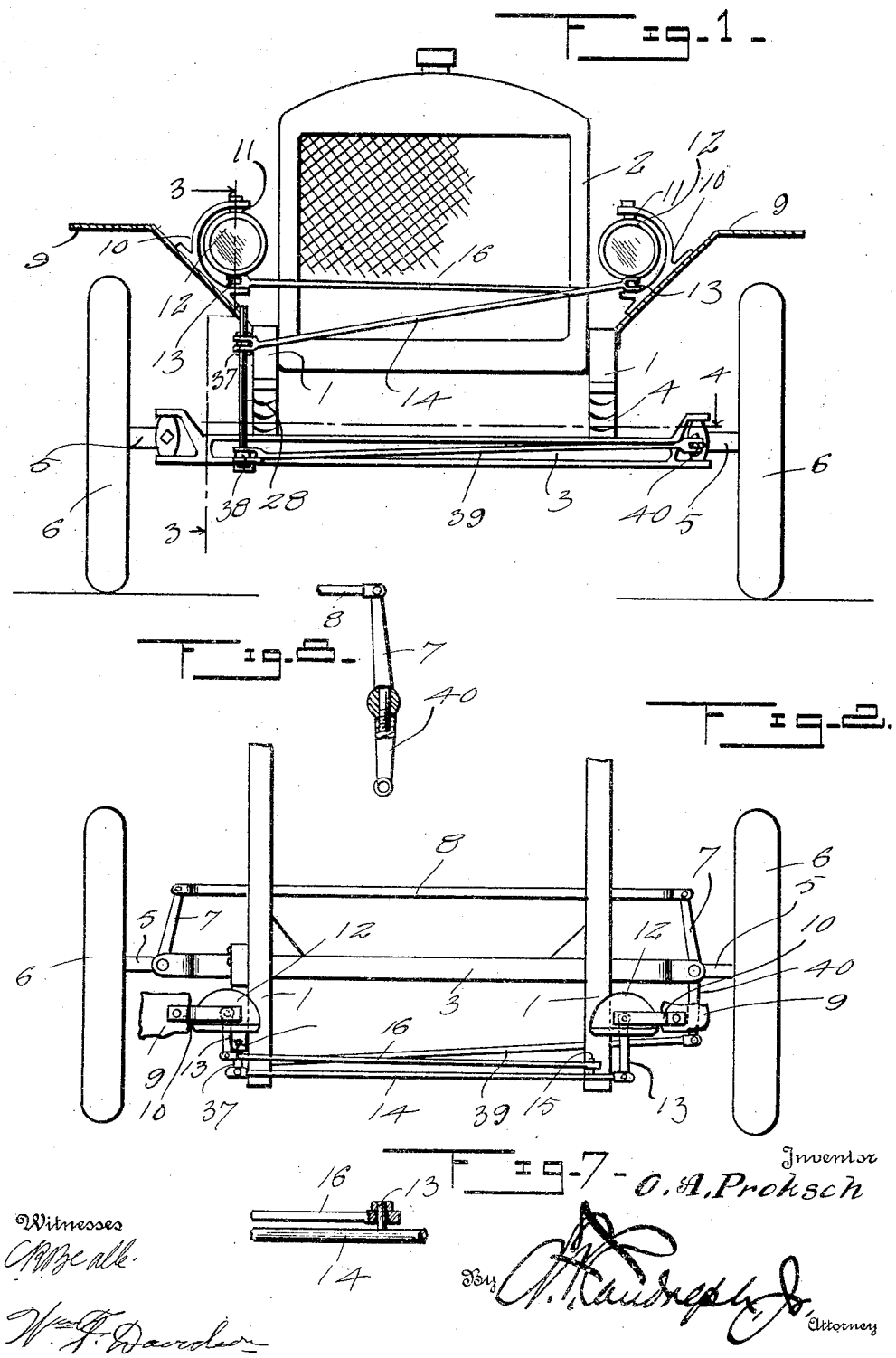

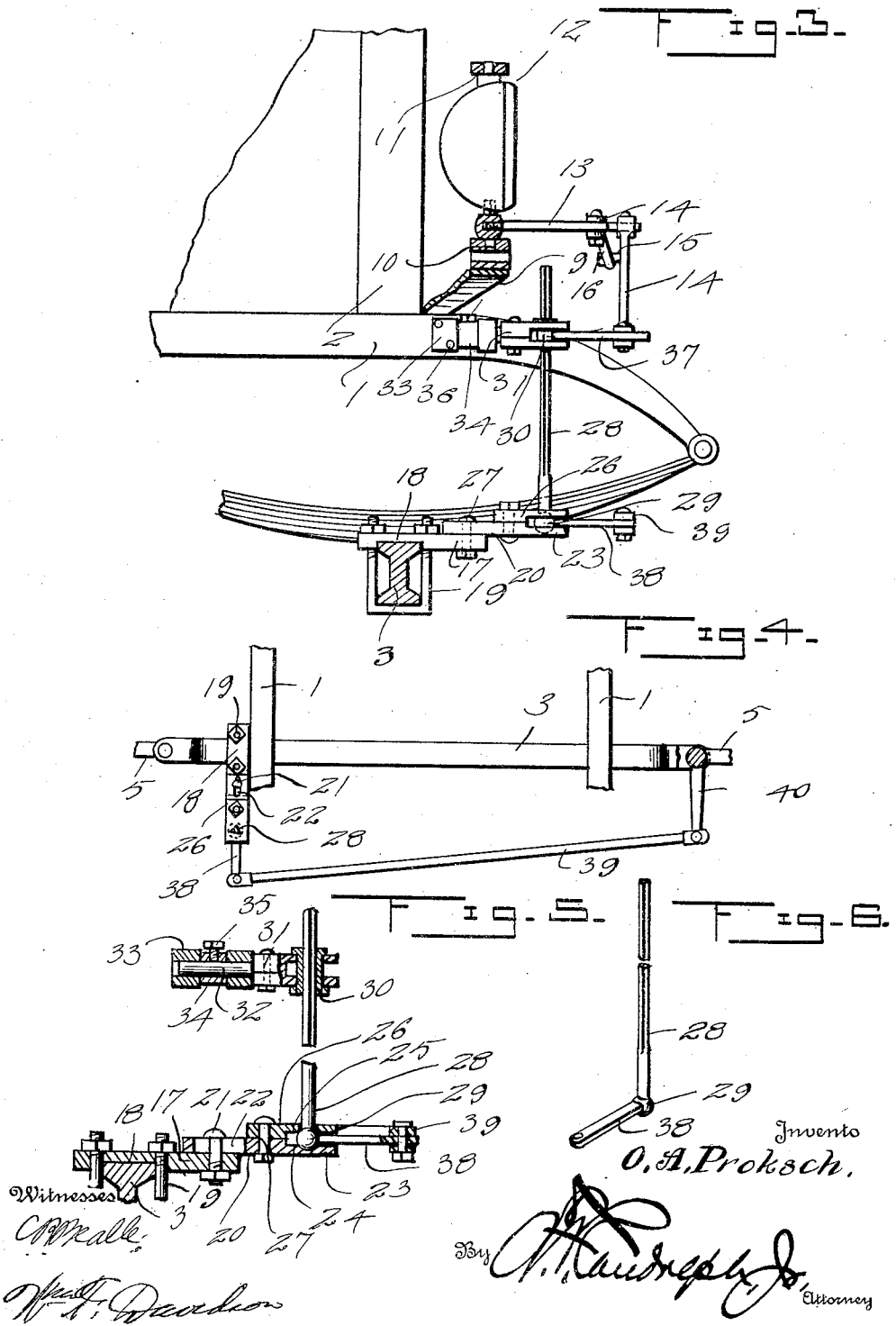

OTTO A. PROKSCH, OF CHASEBURG, WISCONSIN.

AUTOMOBILE DIRIGIBLE HEADLIGHT.

1,292,370.   Specification of Letters Patent.   Patented Jan. 21, 1919.

Application filed November 21, 1917. Serial No. 203,203.

*To all whom it may concern:*

Be it known that I, OTTO A. PROKSCH, a citizen of the United States, residing at Chaseburg, in the county of Vernon and State of Wisconsin, have invented certain new and useful Improvements in Automobile Dirigible Headlights; and I do hereby declare the following to be a full, clear, and exact description of the invention, such as will enable others skilled in the art to which it appertains to make and use the same.

This invention relates to improvements in dirigible headlights for automobiles and has for one of its objects the provision of a device of this character whereby the headlights will be automatically turned in a corresponding direction with the front wheel of an automobile so that the rays of light from the headlights will be directed in the path of the automobile at all times and also provides a construction which will obviate the blinding of the operator of the approaching automobile as the rays of light from the headlights will be directed to one side of the roadway when passing the approaching automobile or vehicle.

Another object of this invention is the provision of means whereby the headlights are conveniently connected to the steering mechanism of the automobile so that upon moving the steering mechanism to turn the front wheels the headlights will be moved in a corresponding direction and which means permits the steering mechanism carried by the front axle to move upwardly and downwardly when passing over uneven ground without affecting or vibrating the headlights.

A further object of this invention is the provision of an automobile dirigible headlight of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which:

Figure 1 is a front elevation of an automobile dirigible headlight constructed in accordance with my invention, Fig. 2 is a top plan view of the same, Fig. 3 is a sectional view taken on the line 3—3 of Fig. 1, Fig. 4 is a fragmentary sectional view illustrating means of connecting the headlight to the steering knuckle of an automobile, Fig. 5 is a fragmentary vertical sectional view illustrating the means of permitting the axle to move upwardly and downwardly without influencing the headlight, Fig. 6 is a perspective view of an actuating rod, Fig. 7 is a detail sectional view illustrating the means of connecting the rods together which connect the headlight, Fig. 8 is a detail sectional view illustrating the means of connecting the invention to the steering knuckle.

Referring in detail to the drawings, the numeral 1 indicates the chassis of an automobile carrying the usual body 2 and which is secured to the front axle 3 by springs 4. The front axle 3 is of the type employing steering knuckles 5 on which are journaled front wheels 6. The steering knuckles 5 are provided with rearwardly extending arms 7 which are connected by a connecting rod 8 to which the steering mechanism of the automobile is connected and which is not shown. The arms 7 extend through the steering knuckles 5 and usually have threaded thereto nuts for securely fastening the arms to the steering knuckles. The chassis 1 has secured thereto the ordinary mud guards or fenders 9 that overlie the front wheels 6. The foregoing description relates to a well known construction of automobile and to which my invention is applied.

A pair of brackets 10 are secured to the mud guards or fenders 9 and are each provided with arcuate shaped arms 11 to which are pivoted headlights 12 of any ordinary construction. The headlights 12 have secured thereto forwardly extending arms 13. One of the arms 13 has pivoted thereto an actuating rod 14, which rod is provided with a pin 15 to which a connecting rod 16 is pivoted and which is in turn pivoted to the other arm 13 of the headlight so that upon movement of the actuating rod 14, the headlights will be caused to move in corresponding directions.

A suitable bracket 17 is provided with a cut out portion 18 which has a serrated face that engages the upper face of the front axle 3 and is secured thereto by means of a substantially U-shaped clamp 19. The bracket 17 has a member 20 adjustably secured thereto by means of a bolt 21. This bolt 21 extends through the bracket 17 and through a slot 22 in the member 20 so that the same can be readily adjusted in relation to the bracket. The member 20 has formed thereon extensions 23 provided with a socket 24 which coöperates with a socket 25 in a member 26 which is secured to the member 20 by a bolt 27. An operating rod 28 has a ball or sphere 29 formed upon its lower end which is disposed within the sockets 25 and 24 so that the rod can readily turn in relation to the member 20. The member or section 26 is provided with an opening for the purpose of permitting the rod 28 to extend upwardly therethrough. The rod 28 is of triangular shape in cross section and is slidably received within a bearing 30 provided with a triangular shaped opening to coöperate with the formation of the rod. The bearing is carried by a suitable bracket 31 which is provided with an extension 32. The extension 32 extends into a bracket 33 and is adjustably secured therein by means of a collar 34 secured upon the extension 32 by a set bolt 35. The bracket 33 is secured in any desired manner to the chassis 1 as illustrated at 36. The bearing 30 is journaled in the bracket 31 and has formed thereon an arm 37 to which the actuating rod 14 is pivoted.

An arm 38 is formed on the ball or sphere and has pivoted thereto a rod or member 39 which is in turn pivoted to a member 40. The member 40 has one end internally screw threaded as clearly illustrated in Fig. 8 for the purpose of threading the same to the steering knuckle arm 7 after the nut has been removed therefrom so that upon movement of the steering knuckle, the member 40 will be moved in a corresponding direction and through the remaining portions heretofore described of the invention, the headlights will be moved in a corresponding direction, thus throwing the rays of light therefrom in the path of the front wheels at all times.

From the foregoing description taken in connection with the accompanying drawings, it will be noted that a device has been provided which will turn the headlights in a corresponding direction with the front wheels of the automobile so that when the automobile is traveling upon a curve the roadway will be illuminated. It will be further noted that means has been provided which will compensate for the upward and downward movement of the front axle in passing over uneven ground without influencing or vibrating the headlights and also means has been provided which permits a slight lateral movement of the automobile body in relation to the axle when passing over uneven ground.

While I have shown and described the preferred embodiment of my invention, it will be understood that minor changes in construction, combination and arrangement of parts, may be made without departing from the spirit and scope of the invention as claimed.

Having thus described my invention, what I claim is:

1. A device of the character set forth comprising a pair of headlights, means pivotally supporting said headlights on an automobile, an actuating rod connected to one of the headlights, means connecting the other headlight to said actuating rod, a vertical rod slidably connected to the actuating rod, means pivotally supporting the vertical rod on an automobile, and means connecting the vertical rod to the steering mechanism of an automobile to turn the headlights in a corresponding direction with the front wheels.

2. A device of the character set forth comprising a pair of pivotally mounted headlights, an actuating rod connected to one of said headlights, means connecting the other headlight to said rod, a bracket, a triangular-shaped rod swivelly and adjustably connected to said bracket, a bearing having a triangular-shaped opening receiving said triangular-shaped rod, means supporting said bearing, means connecting said bearing to the actuating rod, and means connecting the squared rod to the steering mechanism of the automobile.

3. A device of the character set forth comprising a pair of pivotally mounted headlights, an actuating rod connected to one of said headlights, means connecting the other headlight to said rod, a bracket, a triangular-shaped rod connected to said bracket, means connecting said triangular-shaped rod to the steering mechanism of the automobile, a bearing having a triangular-shaped opening receiving said triangular-shaped rod, a second bracket, means adjustably and rotatably securing the second bracket to the bearing, an arm formed on said bearing, and means connecting said arm to the actuating rod.

In testimony whereof I affix my signature in presence of two witnesses.

OTTO A. PROKSCH.

Witnesses:
AUGUST T. KAPANKE,
GUST M. LENSER.

Copies of this patent may be obtained for five cents each, by addressing the "Commissioner of Patents, Washington, D. C."